A. Pietsch,
Beer Cooler.

No. 88,584.   Patented Apr. 6, 1869.

Witnesses.
H. S. Look.
J. B. Smith.

Inventor.
Herman Pietsch
Moritz Walter

HERMAN PIETSCH AND MORITZ WALTER, OF MILWAUKEE, WISCONSIN.

Letters Patent No. 88,584, dated April 6, 1869.

IMPROVED BEER-COOLER.

The Schedule referred to in these Letters Patent and making part of the same.

*To all whom it may concern:*

Be it known that we, HERMAN PIETSCH and MORITZ WALTER, of the city and county of Milwaukee, and State of Wisconsin, have invented a new and useful Improvement in Beer-Coolers; and we do hereby declare that the following is a full, clear, and exact description thereof, which will enable those skilled in the art to make and use the same, reference being had to the accompanying drawing, forming part of this specification, in which—

Figure 1:
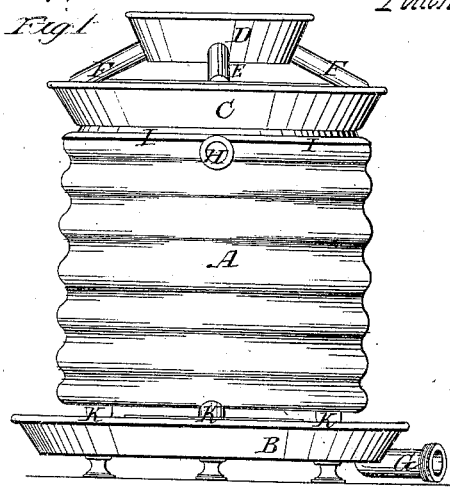
Figure 2:
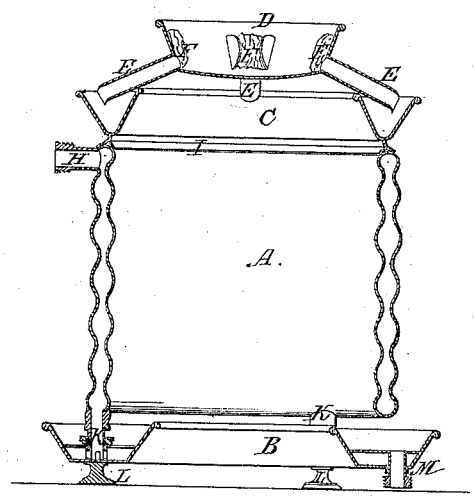

Figure 1 is a side view of our invention;

Figure 2, a vertical section; and

Figure 3:
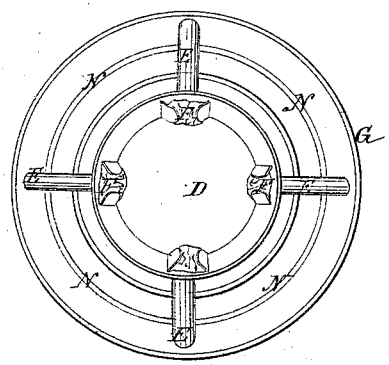

Figure 3 is a view of the top.

Similar letters of reference in each of the figures indicate corresponding parts.

The object of our invention is to produce a superior beer-cooler.

A is the main cylinder of the cooler, made with an outer and an inner corrugated surface.

B is a pan, made double, with a circular opening in its centre, with a raised edge around it. Over this pan stands the cylinder A.

C is a dripping-reservoir, setting on top of the cylinder A.

D is a pan sitting above reservoir C, to receive the beer.

E are spouts to conduct the beer from pan D to the reservoir C.

F, sponges over the ends of spouts E, to filter the beer through, and to keep back hops, dust, &c.

G, inlet-pipe, for cold water.

H, outlet-pipe, for the water.

I, a dividing ridge on reservoir C, to divide the beer, there being two sets of holes, one on the outside and one on the inside, so that the beer will be divided, one-half on the outside and one-half on the inside of cylinder A.

K, passage-pipes from pan B, and on which stands cylinder A, for the cold water to pass from the pan B to the cylinder A.

L, feet of the cooler.

M, outlet-pipe for the beer to pass from pan B.

N, holes for the beer to pass through reservoir C, and down over cylinder A.

Operation.

There is a tub, or cask of water, and is connected to the apparatus by pipes G and H, or there may be a pipe connected with pipe G, and cold water passed through the cooler, and out at pipe H.

The beer is let into pan D, passes through the sponges into the pipes E, and is emptied into the dripping-reservoir C, and, through the holes N, on to the cylinder A, one-half on to the outside and one-half on to the inside, it being distributed by the divider I, and runs down over the cylinder A in a thin film, and drops into the pan B, and out through the outlet M.

The beer strikes the upper, or top part of cylinder A, hot; it grows cooler and cooler as it passes down, till it strikes the cold pan B, and is made perfectly cool, and passes off through pipe M.

The water, if a tub, or cask is used, grows warm at or on top, and grows colder as the beer trickles down. If a pipe is attached to pipe G, and water is forced through and out of pipe H, the coldest water is in the pan at the bottom, and the beer will be cooled gradually, till it will be perfectly cool when it leaves the pan by the outlet M.

We do not claim a beer-cooler made by combining vertical plates, as described in the patent of George B. Farrell, July 16, 1861.

What we claim as our invention, and desire to secure by Letters Patent, is—

Pan D, with filtering-sponges F and spouts E, all in combination, substantially as described.

HERMAN PIETSCH.
MORITZ WALTER.

Witnesses:
H. S. LOAK,
J. B. SMITH.